(12) United States Patent
Onoe

(10) Patent No.: US 6,386,810 B1
(45) Date of Patent: May 14, 2002

(54) HIGH STRENGTH SCREW

(76) Inventor: Hiroshi Onoe, 13-22, Oimazatominami 4-chome, Higashinari-ku, Osaka-shi, Osaka (JP), 537-0013

( * ) Notice: Subject to any disclaimer, the term of this patent is extended or adjusted under 35 U.S.C. 154(b) by 0 days.

(21) Appl. No.: 09/573,416

(22) Filed: May 18, 2000

(30) Foreign Application Priority Data

| May 21, 1999 | (JP) | ............................................. | 11-141272 |
| Oct. 12, 1999 | (JP) | ............................................. | 11-289294 |
| Dec. 28, 1999 | (JP) | ............................................. | 11-375677 |

(51) Int. Cl.$^7$ ............................ F16B 35/00; F16B 35/04
(52) U.S. Cl. ........................ 411/411; 411/424; 411/902; 411/914
(58) Field of Search ............................. 411/378, 387.1, 411/387.6, 411, 424, 902, 903, 914

(56) References Cited

U.S. PATENT DOCUMENTS

| 4,730,970 A | * | 3/1988 | Hyner et al. ............. 411/902 X |
| 5,417,776 A | * | 5/1995 | Yoshino et al. .......... 411/902 X |
| 5,460,875 A | * | 10/1995 | Yoshino et al. .......... 411/411 X |
| 5,605,423 A | * | 2/1997 | Janusz ...................... 411/387.6 |
| 5,700,120 A | * | 12/1997 | Manning et al. ........ 411/411 X |
| 6,109,851 A | * | 8/2000 | Bauer et al. ................ 411/411 |

* cited by examiner

*Primary Examiner*—Neill Wilson
(74) *Attorney, Agent, or Firm*—Armstrong, Westerman & Hattori, LLP

(57) ABSTRACT

An object is to provide a high strength screw in which a high strength steel material not used in the prior art is employed as the tapping screw or gib-head screw or bolt or the like, and moreover, which, by the administering of a carburization hardening process on the surface thereof, has high tensile stress and shear stress, and has high surface hardness, and which has, particularly in tapping screws, good male thread formability with respect to the foundation hole of the opposing member, and very good tightening and joining properties and durability. Another object of the present invention is to provide compatibility with a machine screw in such a way that, once the tapping screw has been removed from the opposing member, a machine screw can be screwed into the male thread formed by the tapping screw. A screw is formed from a screw material which comprises a high tensile steel, and a surface hardening process, in particular a continuous quenching gas carburization process, is performed on, at the least, the thread part to form a surface hardened layer of a depth in the range of 0.05 to 0.3 mm.

5 Claims, 2 Drawing Sheets

(a)

(b)

(c)

HIGH STRENGTH SCREW

BACKGROUND OF THE INVENTION

1. Field of the Invention

The present invention relates to a high strength screw such as a tapping screw, or a gib-head screw or bolt, which effects tightening and joining while forming a male thread in a opposing member in which a foundation hole has been formed.

2. Description of the Related Art

Screws such as tapping screws, and notably including gib-head screws and bolts, have hitherto been used as tightening and joining means in a variety of fields. These tapping screws are advantageous in that, by the simple forming of a foundation hole in an opposing member they create their own tapping as they are screwed, and so the advance work required to form a male thread in a opposing member, such as in the tightening and joining using normal machine screws (bolts and nuts), is saved, and the work can be markedly reduced.

Since a male thread must be formed in the opposing member in this way, the tapping screws must be sufficiently harder than the opposing member, and they must also possess the mechanical qualities required of a tightening and joining means (resistance to fatigue and resistance to impact and so on). For this reason, conventional tapping screws have normally been screws formed by the component rolling of a screw material comprising low carbon structure steel in which the surface thereof has been hardened by thermal processing. That is to say, the surface of the thread part of the tapping screw is a high carbon martensite that has a hardness equivalent to tool steel, and the core part is a low carbon martensite high in toughness. It should be noted that, since bolts and screws and the like are tension members, toughness is lost and strength is reduced in surface hardness processing, and it is commonly recognized that this is undesirable and that a thorough firing and bating (tempering) should be performed.

In addition, because conventional tapping screws form male threads in an opposing member, a large rotating force is required and so, although the fastening forces are sacrificed to a degree, the pitch of the thread part is enlarged to lessen the torque necessary for rotation. On the other hand. Although S Taito screws which have the same thread part pitch as a machine screw ("S Taito" is a registered trade name of the Nitto Seiko K.K) are in existence, these are unsuitable for application involving tightening and joining in an opposing member because of their large tension. Generally, once conventional tapping screws have been removed from an opposing member in order for repairs or the like to be made they are unfit for refastening. That is to say, the screw thread of a tapping screw is subject to substantial damage as it is screwed in to create the tapping in a foundation hole of an opposing member, and the screw thread is also partly crushed by vibration and the like.

Because of the problems of material strength, surface hardening processing problems, and problems of workability such as this, there is no thought given to the re-tightening and joining of conventional tapping screws once they have been removed from tightening and joining with an opposing member, and consideration is given only to their workability at the time of initial tightening and joining, that is to say, to whether the male thread can be formed with little torque in the foundation hole. Up to this point, a description has been given of conventional examples and their problems taking tapping screws, which constitute a mode which has rigorous use, as an example, but the principal part of the above description holds true for general screws as well such as gib-head screws and bolts and the like.

SUMMARY OF THE INVENTION

It is an object of the present invention, in solving the problems in light of the above-described conditions, to provide a high strength screw in which a high strength steel material not used in the prior art is employed as the tapping screw or gib-head screw or bolt or the like, and moreover, which, by the administering of a carburization hardening process on the surface thereof, has high tensile stress and shear stress, and has high surface hardness, and which has, particularly in tapping screws, good male thread formability with respect to the foundation holes of the opposing member, and very good tightening and joining properties and durability. A further object of the present invention is to provide compatibility with a machine screw in such a way that, once the tapping screw has been removed from the opposing member, a machine screw can be screwed into the male thread formed by the tapping screw.

The present invention, in order to solve the above-described problems, is configured from a high strength screw formed from a screw material which comprises a high tensile steel, wherein a surface hardening process is performed on, at the least, the thread part, to form a surface hardened layer. Here, it is preferable that the abovementioned screw material be a type selected from carbon steel, aluminium killed steel, nickel-chromium-molybdenum steel, and chromium-molybdenum steel in which the carbon content is not less than 0.20%. In these cases, it is preferable that that the abovementioned surface hardening processing is continuous quenching gas carburization processing. Furthermore, it is preferable that the depth of said surface hardened layer is set within the range 0.05 to 0.3 mm by continuous quenching gas carburization processing.

In addition, the present invention is a high strength screw, wherein, when a nominal diameter of the screw is not more than 6 mm, said screw material contains carbon in an amount in the range 0.09 to 0.13%, manganese in an amount in the range 1.00 to 1.30%, aluminium in an amount in the range 0.02 to 0.05%, and the residual, apart from a plurality of metal elements contained in minute amounts, is iron, and the depth of said surface hardened layer is set within the range 0.05 to 0.3 mm by a quenching gas carburization process performed at a constant temperature; and when a nominal diameter of the screw is 8 to 12 mm, said screw material contains carbon in an amount in the range 0.15 to 0.18%, manganese in an amount in the range 1.00 to 1.50%, aluminium in an amount in the range 0.02 to 0.05%, and the residual, apart from a plurality of metal elements contained in minute amounts, is iron, and the depth of said surface hardened layer is set within the range 0.3 to 0.7 mm by a quenching gas carburization process performed at a constant temperature, and the surface hardness of the thread part is a Vickers hardness of 550 to 700 Hv, the hardness of the core part is a Vickers hardness of 200 to 320 Hv, and the tensile strength is 800 to 1200 N/mm². Furthermore, the present invention is a high strength screw, wherein the structure of the depth is fine-divided and the high strength screw is formed which has both toughness as a tension member and a surface hardness of a degree that it will not be subjected to damage by the opposing member.

In addition, if the abovementioned screw is a tapping screw and the pitch of the abovementioned thread part is further set to a pitch which has compatibility with a machine screw, and furthermore, and it is preferable that the abovementioned tapping screw be an S Taito form ("S Taito" is a registered trade name of the Nitto Seiko K.K) as once it is removed from, the opposing member after tightening and joining, re-tightening and joining can be effected by using the tapping hole formed initially, and a machine screw be used as a replacement and screwed in.

In addition, it is preferable that metal plating be performed on the surface of the abovementioned surface hardened layer to form a protective covering and to increase corrosion resistance.

DESCRIPTION OF THE PREFERRED EMBODIMENTS

Figure 1:
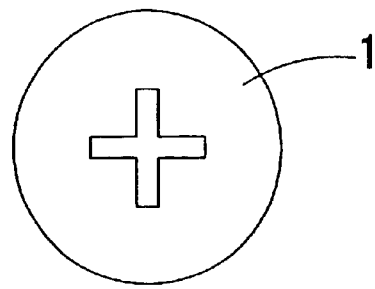
FIG. 1 shows a representative S Taito screw as a mode of the embodiment of the tapping screw of the present invention, here (a), (b) and (c) show, respectively, a plane surface view, side surface view and base surface view thereof.
Figure 1:
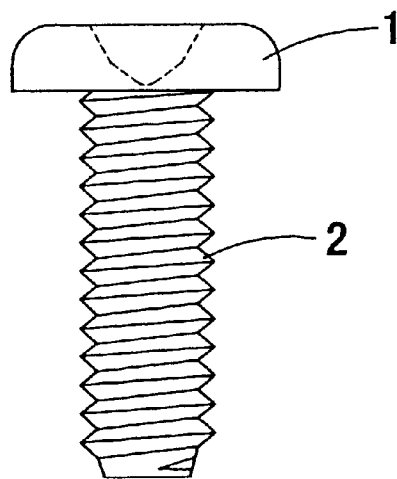
Figure 1:
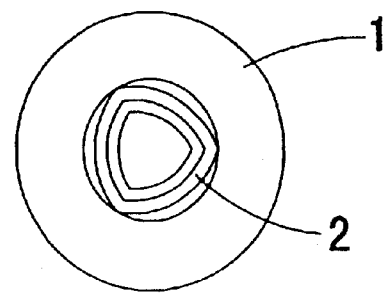

Next, a more detailed description of the mode of embodiment of the present invention will be given.

The high strength screw of the present invention is formed from a screw material which comprises a high tensile steel in which, by the administering of a surface hardening process, in particular, continuous quenching gas carburization processing on, at the least, the thread part, a surface hardened layer within the range of depth 0.05 to 0.3 mm is formed. By doing this, a screw is formed which has high tensile stress and shear stress and has high surface hardness. In particular, if a tapping screw is used, a high strength tapping screw which has good male thread formability with respect to foundation holes of the opposing member and which has very good tightening and joining properties and durability is formed.

[Screw Material]

A first screw material employed in the high strength screw of the present invention employs a high tensile steel hitherto employed in high tensile bolts, or a high carbon steel or alloy steel in which the carbon content ratio is not less than 0.20%. Specific examples of the screw material include a cold-heading carbon steel (steel not less than SWRCH 220), machine structured carbon steel (S20C, S38C, S45C), machine structured alloy steel (nickel-chromium-molybdenum steel (SNCM 240, SNCM 630), chromium-molybdenum steel (SCM 415, SCM 435, SCM 440), and aluminium killed steel). Carbon steel In which the carbon content ratio Is not less than 0.22% and aluminium killed steel which also have a carbon content ratio not less than 0.20% are particularly preferred. As a typical first screw material employed in the present invention, a chemical component of aluminium killed steel is shown in Table 1 below.

TABLE 1

| | Chemical component of first screw material | | | | | | | | | | | |
|---|---|---|---|---|---|---|---|---|---|---|---|---|
| | Element | | | | | | | | | | | |
| | C X100 | Si X100 | Mn X100 | P X1000 | S X1000 | Cu X100 | Ni X100 | Cr X100 | Mo X100 | Al X1000 | B X10000 | V X1000 | Fe |
| Compound amount (%) | 21 | 3 | 89 | 17 | 5 | 1 | 1 | 3 | — | 40 | — | — | RESIDUAL |

In addition, if, as a second screw material employed in the present invention, a screw material is employed which has a carbon amount in the range 0.09 to 0.18%, a manganese amount in the range 1.00 to 1.50% and an aluminium amount in the range 0.02 to 0.05%, and in which the residual, apart from a plurality of metal elements contained in minute amounts, is iron, an even higher strength screw can be manufactured by the fine-dividing of the depth structure. More specifically, when a nominal diameter of the screw is not more than 6 mm, the material is one in which the amount of C contained is within the range 0.09 to 0.13%, the amount of Mn contained is adjusted to within the range 1.00 to 1.30%, the amount of Al contained is within the range 0.02 to 0.05%, other metal elements contained in the normal steel material such as Si, P, S, Cu, Ni, and Cr are adjusted to minute amounts, Cu and P, in particular are made much less, and the amount of Mn is raised. And, when a nominal diameter of the screw is 8 to 12 mm, the material is one in which the amount of C contained is within the range 0.15 to 0.18%, the amount of Mn contained is adjusted to within the range 1.00 to 1.50%, the amount of Al contained is within the range 0.02 to 0.05%, other metal elements contained is same as above. A representative chemical component of this material of which a nominal diameter is not more than 6 mm, is shown in Table 2 below.

TABLE 2

Chemical component of second screw materail

| | \multicolumn{11}{c}{Element} | |
|---|---|---|---|---|---|---|---|---|---|---|---|---|
| | C X100 | Si X100 | Mn X100 | P X1000 | S X1000 | Cu X100 | Ni X100 | Cr X100 | Mo X100 | Al X1000 | B X10000 | V X1000 | Fe |
| Compound amount (%) | 11 | 8 | 112 | 11 | 8 | 8 | 4 | 5 | — | 27 | — | — | RESIDUAL |

[Screw Processing]

The method of forming the high strength screw of the present invention is a method that has been hitherto well-known. That is to say, it is formed by taking the above-described screw material as a wire rod, header-processing the end part of said wire rod to form a head part, and cutting to a predetermined length wherein component rolling is performed to form the thread part.

[Representative Screw Mode]

A representative screw mode of a tapping screw is shown in FIG. 1 as an example of the high strength screw of the present invention. The tapping screw shown in FIG. 1, which is commonly referred to as an S Taito screw, has a head part 1 and thread part 2, wherein the cross section from the base part to the end point of said thread part 2 alters from a cylindrical shape to a rounded 3-sided shape. Other modes of screws include a hollow set tapping screw, cap-screw tapping screw, and high strength tapping screw and hexagonal tapping screw.

In these S Taito screws the contact resistance is small and a male thread can be formed in the foundation hole with little torque because the end point of the thread part 2, which first inserts into the foundation hole of the opposing member, forms a 3-point contact with the foundation hole. In addition, the pitch of the screw thread of the abovementioned thread part 2 is set to the same pitch as those which are classified as machine screws in the screw component types stipulated by the JIS, and it is provided with compatibility with machine screws. However, the tapping screw of the present invention is not limited to the above-described screw mode and hitherto widely known tapping screws can be adopted as the screw mode.

[Surface Hardening Process]

The surface hardening process is administered on the screw formed in the manner described above whereby a surface hardened layer is formed, at the least, on the surface of the thread part. Here, examples of the surface hardening process include carburization processing, nitriding processing, high-frequency processing and fire quenching, but carburization processing is particularly preferred. In addition, examples of carburization processing include carburization quenching, vacuum quenching processing and aluminium quenching processing. It is preferable that the depth of the surface hardened layer, that is to say, the carburization hardened layer, be set within the range 0.05 to 0.3 mm when using a first screw material. When the depth of the carburization hardened layer is less than 0.05 mm the effect of the hardening is insufficient, and at a depth greater than 0.3 mm, not only has the effect reached saturation but the core part of the screw part becomes brittle which makes it unsuitable for high tensile force joining and tightening. When using a second screw material, it is preferable that the depth of the surface hardened layer be set within the range 0.05 to 0.3 mm when the nominal diameter is not more than 6 mm, and it be set within the range 0.3 to 0.7 mm when the nominal diameter is 8 to 12 mm. The reason is same as above.

This surface hardening process fundamentally constitutes thermal processing, and it is the most crucial step as it imparts a large effect to the mechanical characteristics of the screw. In other words, characteristics that are reciprocal with strength and toughness must be imparted simultaneously by way of the thermal processing.

The carburization quenching process is a process in which carbon is caused to diffuse and permeate into the surface of steel, and is commonly known as carburization processing. If carburization quenching is performed the surface is hardened to produce a tapping screw which comprises a surface which has resistance to wear and a core part which has very good toughness. Carburization usually involves the heating of the product to around 900° C. whereby the reaction noted below proceeds.

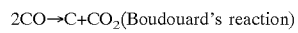
2CO→C+CO$_2$(Boudouard's reaction)

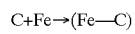
C+Fe→(Fe—C)

Here, when a large amount of oxygen is present in the quenching furnace, the carbon component of the steel material forms a compound with the oxygen whereby, conversely, decarburization occurs which lessens the amount of carbon, so in reality, the theoretical amount of air is mixed with butane gas, an RX gas denatured by a denaturing furnace is sent into the quenching furnace, and carburization is performed by a carrier gas and a small amount of enriched gas.

Here, in the carburization processing, from the equilibrium between the solid solution limits and permeability to the screw material of the carbon elements, generally the process is performed at a temperature of 700° C. or greater which constitutes the A1 transformation point of steel. However, in a steel material which contains a high density of chromium such as a chromium-molybdenum steel, when carburization is performed at a high temperature of not less than 700° C., it is well known that thermodynamically stable chromium carbide precipitates in large amounts in the grain interface or laminated faults. When the carbide precipitates, the amount of chromium solidified in the screw material is reduced whereby resistance to corrosion is lowered markedly. Furthermore, when stored for a long time at a temperature which exceeds the re-crystallization temperature of steel (approximately 450° C.), not only is the screw material softened which markedly lowers the strength of the core part, but the precipitated chromium carbide is made coarse so the surface hardness of the carburization hardened layer does not reach a Vickers hardness of not less than Hv 600 to 650. On the other hand, when the carburization temperature is set to 500° C. or less in order to prevent coarsening of the chromium carbide and softening of the screw material, the permeation of the carbon elements becomes difficult and a satisfactory hardened layer cannot be formed due to the presence of a passive oxidation film formed in the surface of the steel material. Accordingly, in a steel material which contains a high density of chromium such as a chromium-molybdenum steel, it is preferable that the temperature of the carburization process be set to a temperature which is considerably lower than 900° C., and more preferably a carburization temperature of 500° C. to 700° C.

Figure 2:
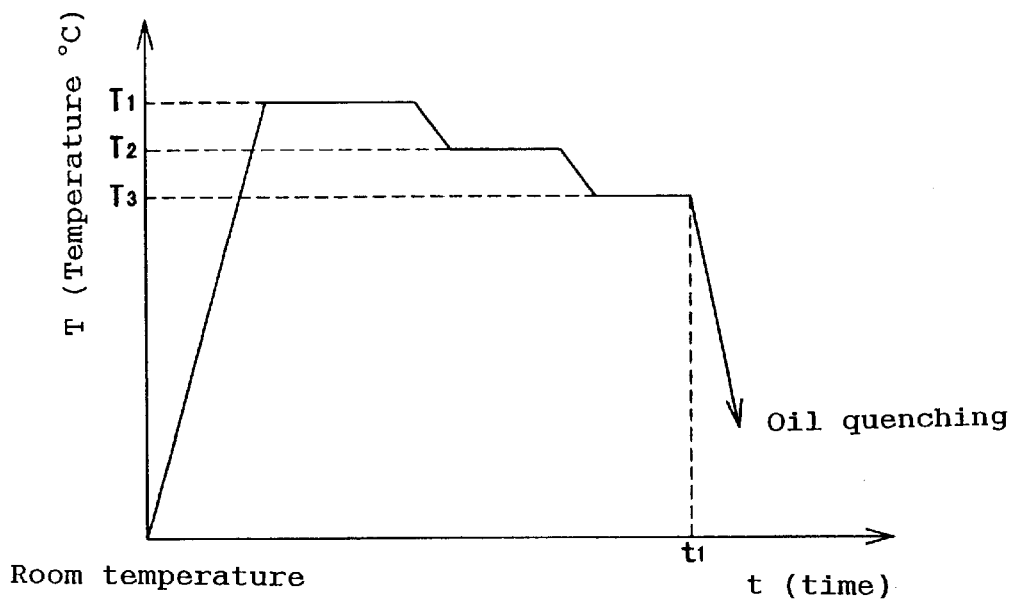
FIG. 2 is a graph which describes the relationship between time and temperature in the continuous quenching gas carburization processing of the first screw material.

The carburization quenching process adopted as the surface hardening process of the first screw material of the present invention is a process known as continuous quenching gas carburization processing. In this continuous quenching gas carburization process, as shown in FIG. 2, the screw is heated to a temperature $T_1$ and carburization is effected while said temperature is maintained for a set time, following which the system is cooled to a temperature $T_2$ and held for a set time in the state thereof, wherein it is finally cooled to a temperature $T_3$ and held for a set time in said state following which it is oil quenched. In this way, the martensite amount of the screw core part can be suppressed and the ferrite amount caused to increase to increase the toughness. More specifically, when the first screw material is aluminium killed steel, the temperature $T_1$ is from 810° C. to 900° C., and the temperature $T_3$ is from 760° C. to 800° C. Here, the difference between the temperature $T_1$ and temperature $T_3$ is set in the region of about 50° C. to 100° C. In addition, it is preferable that the temperature $T_2$ be set lower than the median temperature of temperature $T_1$ and temperature $T_3$. The time $t_1$ depends on the diameter of the thread part but is approximately 40 minutes to 60 minutes.

Finally, the screw in which the above-described continuous quenching gas carburization process has been administered is retained at a temperature of 240° C. to 430° C. for 40 to 60 minutes whereby tempering processing is performed. The surface hardness of the thread part on which this series of thermal processes has been administered has a Vickers hardness of 500 Hv to 600 Hv, and similarly, the hardness of the core part is 280 Hv to 350 Hv. It will be noted that when a tensile test (based on JIS B-1051) using a 0° to 10° wedge was carried out, there was no pulling away of the head when it was pulled under a standard load. In practice, when a screw having a nominal diameter of 4 mm is manufactured, the depth of the surface hardened layer is 0.06 to 0.08 mm and the tensile strength is 1030 to 1110 N/mm$^2$.

Figure 3:
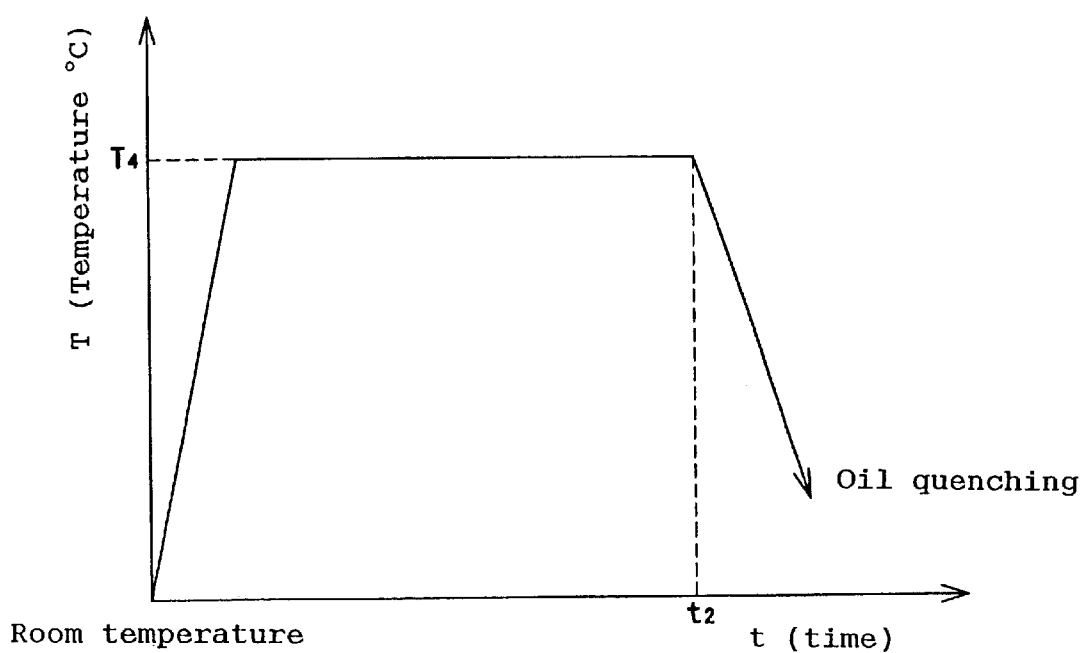
FIG. 3 is a graph which describes the relationship between time and temperature in the gas carburization processing of the second screw material.

In addition the carburization quenching process adopted as the surface hardening process of the second screw material of the present invention is a quenching gas carburization process performed at a constant temperature. In this gas carburization process, as shown in FIG. 3, the screw is heated to a temperature $T_4$, carburization is performed for a set time ($t_2$) while said temperature is maintained, and then oil quenching is performed to afford quenching. Practically the temperature $T_4$ is 850 to 900° C. and the time $t_2$ is 40 to 60 minutes. After this, the screw in which the above-described gas carburization process has been administered is retained at a temperature of 220° C. to 350° C. for 40 to 60 min whereby tempering processing is performed. The surface hardness (depth 0.02 mm) of the thread part on which this thermal processing has been administered has a Vickers hardness of 550 Hv to 700 Hv, and, similarly, the hardness of the core part (D/4) is 200 Hv to 320 Hv. It will be noted that a tensile test (based on JIS B-1051) using a 0° to 10° wedge was performed, but there was no pulling away of the head even when pulled under a standard load. In addition, when the nominal diameter is 6 mm and the depth of the surface hardened layer is 0.21 to 0.22 mm, the tensile strength until breakage over 10 samples was 890 to 990 N/mm$^2$. The samples in which the tempering process had been conducted at lower temperatures had particularly good tensile strength. In addition, an effect appeared whereby the mechanical characteristics were better in the simple thermal processing shown in FIG. 3 pertaining to this material compared to the second screw material in which continuous quenching gas carburization had been administered, as shown in FIG. 2,

[Plating Processing]

There are cases, even if a surface hardened layer, and in particular, a carburization hardened layer, has been formed on the surface of the abovementioned screw, in which the resistance to corrosion is poor. For that reason, it is preferable that metal plating be performed on the surface of the surface hardened layer to form a protective cover. Examples of this metal plating include zinc plating, chromium plating, black chromium plating and nickel plating.

Zinc plating is widely used in the rust proofing of steel, and the administering of a chromate processing forms a protective cover, which is better in terms of aesthetics and resistance to corrosion. Chrome plating involves zinc plating followed by chromate processing wherein a chrome covering is formed, and this chrome covering has good resistance to wear, resistance to corrosion and resistance to heat. Black chromium plating has good resistance to corrosion but is lacking in resistance to wear so it is suitable for the retaining of the state prior to use of the tapping screw. Nickel plating is considerably more stable than iron with respect to air and dampness and forms a protective covering that has good resistance to corrosion. These varieties of metal plating should be selected as appropriate in accordance with need.

Based on the high strength screw of the present invention as described above, a screw is formed using a first screw material comprising high tension steel, and, since a surface hardening process, in particular, continuous quenching gas carburization processing, is administered on, at the least, the thread part to form a surface hardened layer of depth in the range of 0.05 to 0.3 mm, a high strength tapping screw is provided which has high tensile stress and shear stress and has high surface hardness, and particularly in the case of a tapping screw it has better durability and male thread formability with respect to the foundation holes of the opposing member and has very good tightening and joining properties, and it has hitherto unseen excellent mechanical characteristics.

Furthermore, when the screw is manufactured by using a second screw material of which component is adjusted according to a range of the nominal diameter of the screw, and by adjusting the depth of the carburization hardened layer, the screw cab be made as a high strength screw, wherein the surface hardness of the thread part is a Vickers hardness of 550 to 700 Hv, the hardness of the core part is a Vickers hardness of 200 to 320 Hv, and the tensile strength is 800 to 1200 N/mm$^2$. Particularly, toughness can be improved by controlling a hardness of a core part and a delayed fracture resistance can be also improved.

In addition the pitch of the abovementioned thread part is set to a pitch which is compatible with a machine screw, and furthermore, when the abovementioned tapping screw shape is an S Taito screw, it is provided with compatibility with a machine screw in such a way that, once the tapping screw has been removed from the opposing member, a machine screw can be screwed into the male thread formed by the tapping screw.

What is claimed is:

1. A high strength screw formed from a screw material that comprises a high tensile steel, in which a surface hardening processing is performed on, at the least, the thread part to form a surface hardened layer, wherein when a nominal diameter of the screw is not more than 6 mm, said screw material contains carbon in an amount in the range 0.09 to 0.13%, manganese in an amount in the range 1.00 to 1.30%, aluminum in an amount in the range 0.02 to 0.05%, and the residual, apart from a plurality of metal elements contained in minute amounts, is iron, and the depth of said surface hardened layer is set within the range 0.05 to 0.3 mm by a quenching gas carburization process performed at a constant temperature; and when a nominal diameter of the screw is 8 to 12 mm, said screw material contains carbon in an amount in the range 0.15 to 0.18%, manganese in an amount in the range 1.00 to 1.50%, aluminum in an amount in the range 0.02 to 0.05%, and the residual, apart from a plurality of metal elements contained in minute amounts, is iron, and the depth of said surface hardened layer is set within the range 0.3 to 0.7 mm by a quenching gas carburization process performed at a constant temperature, and the surface hardness of the thread part is a Vickers hardness of 550 to 700 Hv, the hardness of the core part is a Vickers hardness of 200 to 320 Hv, and the tensile strength is 800 to 1200 N/mm.

2. The high strength screw according to claim 1 wherein metal plating is performed on the surface of said surface hardened layer to form a protective covering.

3. The high strength screw according to claim 1, wherein said screw is a tapping screw.

4. The high strength screw according to claim 3, wherein the pitch of said thread part is set to a pitch which has compatibility with a machine screw.

5. The high strength screw according to claim 3, wherein said tapping screw form is an S Taito screw having a head part and a thread part, wherein the cross section from a base part to an end point of said thread part alters from cylindrical shape to a rounded 3-sided shape.

* * * * *